United States Patent [19]
Theriault et al.

[11] Patent Number: 6,049,821
[45] Date of Patent: Apr. 11, 2000

[54] PROXY HOST COMPUTER AND METHOD FOR ACCESSING AND RETRIEVING INFORMATION BETWEEN A BROWSER AND A PROXY

[75] Inventors: Roger Theriault, Boynton Beach, Fla.; Thomas Wayne Lockhart, Richmond, Canada; Robert D. Battin, Palatine, Ill.

[73] Assignee: Motorola, Inc., Schaumburg, Ill.

[21] Appl. No.: 08/788,971

[22] Filed: Jan. 24, 1997

[51] Int. Cl.[7] ................................................ G06F 13/00
[52] U.S. Cl. .......................................... 709/203; 709/246
[58] Field of Search ........................ 395/200.31–200.33, 395/200.47–200.49, 200.76, 187.01; 713/201; 709/201–203, 217–219, 246

[56] References Cited

U.S. PATENT DOCUMENTS

| | | | |
|---|---|---|---|
| 5,586,260 | 12/1996 | Hu | 395/187.01 |
| 5,623,600 | 4/1997 | Ji et al. | 395/187.01 |
| 5,678,041 | 10/1997 | Baker et al. | 707/9 |
| 5,696,898 | 12/1997 | Baker et al. | 395/187.01 |
| 5,699,458 | 12/1997 | Sprague | 382/250 |
| 5,706,507 | 1/1998 | Schloss | 707/104 |
| 5,708,780 | 1/1998 | Levergood et al. | 395/200.59 |
| 5,727,159 | 3/1998 | Kikinis et al. | 395/200.76 |
| 5,736,984 | 4/1998 | Jellinek et al. | 345/338 |
| 5,748,897 | 5/1998 | Katiyar | 395/200.49 |
| 5,754,939 | 5/1998 | Herz et al. | 455/4.2 |
| 5,761,683 | 6/1998 | Logan et al. | 707/513 |
| 5,764,235 | 6/1998 | Hunt et al. | 345/428 |
| 5,781,550 | 7/1998 | Templin et al. | 370/401 |
| 5,781,909 | 7/1998 | Logan et al. | 707/200 |
| 5,867,651 | 2/1999 | Dan et al. | 709/203 |
| 5,918,013 | 6/1999 | Mighdoll et al. | 709/217 |

OTHER PUBLICATIONS

Microsoft Press Computer Dictionary, 2nd ed., Microsoft Press, p. 167, 1994.

Bartlett, J., "Experience with a Wireless World Wide Web Client", WRL Technical Note TN–46, Digital Equipment Corp., pp. 1–13, Mar. 1995.

Schilit et al., "TeleWeb: Loosely connected access to the World Wide Web", Computer Networks and ISDN Systems, vol. 11, No. 28, pp. 1431–1444, May 1996.

Fox et al., "Reducing WWW latency and bandwidth requirements by real–time distillation" Computer Networks and ISDN Systems, vol. 11, No. 28, pp. 1445–1456, May 1996.

*Primary Examiner*—Zarni Maung
*Assistant Examiner*—Andrew Caldwell
*Attorney, Agent, or Firm*—Hugh C. Dunlop; Charles W. Bethards

[57] ABSTRACT

A query (160) is sent from a browser (100, 101) to a proxy (300) directed to an information source (140) in a networked data communications system. In one aspect, the query is modified by the proxy to provide a modified query and the modified query is forwarded to the information source (120). A response (170) is received at the proxy from the information source and forwarded to the browser. In another aspect the response is modified by the proxy to provide a modified response (370) which is forwarded to the browser. The proxy (300) has a proxy configuration database (340) including a file (341) of services identifying a method of filtering for a specified browser (100) and filters (302, 304) for filtering responsive to the file of services, respectively, queries from and responses to the specified browser. The method of filtering may vary or be modified, for example, according to attributes of the URL within the query, proxy attachment point (310) for the browser, response content, or changing browser requirements, as user, device, or network service needs change.

28 Claims, 9 Drawing Sheets

PROXY HOST COMPUTER AND METHOD FOR ACCESSING AND RETRIEVING INFORMATION BETWEEN A BROWSER AND A PROXY

FIELD OF THE INVENTION

The present invention relates to communications and more particularly with improved methods for accessing and retrieving information in a networked data communication system via an enhanced proxy. Separately and in addition it relates to a proxy for accessing and retrieving information between a networked data communications system and a browser.

BACKGROUND OF THE INVENTION

In a networked data communications system, users have access to terminals which are capable of requesting and receiving information from local or remote information sources. In such a system the terminal may be a personal computer (PC), a cellular phone, a mobile data terminal, a radio modem, a portable computer, a personal digital assistant (PDA), a pager, or any other similar device. The capability of the terminal to request and receive information may be provided by an application program or other such mechanism. A terminal provided with these capabilities is referred to as a browser.

In such a system the information source may be a server (e.g., a host computer) coupled to a mass information storage device (e.g., a hard drive disk pack). The exchange of information (i.e., the request and receipt of information) between the terminal and information source is facilitated by a connection referred to as a communication channel. The communication channel may be physically realized via a wire (e.g., a telephone line), a radio signal (e.g., a radio frequency (RF) channel), a fiber optic cable, a microwave link, a satellite link or any other such medium or combination thereof connected to a network infrastructure. The infrastructure may be a telephone switch, a base station, a bridge, a router, or any other such specialized component, and facilitates the connection between the browser and the network. Collectively, the interconnected group of terminals, physical connections, infrastructure and information sources is referred to as a network.

The network itself may take a variety of forms. It may be located within a small, local geographic area, such as an office building, and consist of only a limited number of terminals and information sources. This type of network is commonly referred to as a Local Area Network (LAN). On a broader scale, it may be larger and support more users over a wider geographic area, such as across a city or state. This type of network is commonly referred to as a Wide Area Network (WAN). On an even broader scale the LAN and WAN networks may be interconnected across a country or globally. An example of a globally connected public data communications network is the Internet.

To a user the Internet appears to be a single unified network, although in reality it consists of hundreds different types of computer platforms utilizing many diverse data communications technologies. The technologies are connected together in such a manner so they appear transparent to the user. This transparency is made possible through the use of a standard communications protocol suite known as Transmission Control Protocol/Internet Protocol (TCP/IP).

Recently, Hypertext Markup Language (HTML) and Hypertext Transfer Protocol (HTTP) in particular have developed to make the World Wide Web very accessible.

The exchange of information on the Web is further facilitated through hypertext documents. Hypertext documents are unique in that they use tags to define links (i.e., highlighted or underscored words or phrases) which, when selected, fetch the related information from within the same document or from a new document altogether. The links are defined using HTML which provides a document formatting method that adapts in a consistent manner to any computer on which it is displayed. HTML tags are used to define the various components of an ASCII text file which make up a hypertext document, including such things as formatting and linking to other documents. Tags which link documents on one Web information source to those on another do so by associating a Uniform Resource Locator (URL) with the referenced information. The ability to link Web files of similar and/or differing formats to each other, and to link documents on other Internet sites, is a very powerful feature of the Web.

The development of sophisticated browsers specifically for the Web, (i.e., browsers which utilize HTTP to request and receive HTML documents) have also helped to further increase its use and popularity. Standard web browsers, such as Mosaic™ or Netscape™, adhere to standard HTML and HTTP protocols and conventions.

The appeal of the Internet is the large-scale interconnection of public and private networks. A concern exists, however, about "un-authorized" access from public networks to the attached private networks. This concern has resulted in the development of proxies. A proxy is a host computer or mechanism (usually an application program) on a network node which performs specialized functions on a network. One such function is to provide network security. Security is provided between a private and public network by requiring communications (i.e., information exchanges) to pass through the proxy. Another function of a proxy is to store or cache recently accessed information (i.e., copies of documents and images). If a browser desires information which is located outside the local network that is to say on an information source attached to an external network, communications pass from the browser through the proxy before going on to the external network.

Thus a proxy may operate to deny access to a private network from a public network by not replying to HTTP commands received from the public network.

Also a proxy may operate to deny access to specific Web sites, for example sites potentially offering undesirable information. This is achieved by maintaining a list of URLs at the proxy to which access is to be denied. HTTP commands which contain these URLs are not executed by the proxy and are responded to with a predefined message. It is also achieved by identifying a particular string in a HTTP command and sending the predefined message if such a string is identified.

While proxies address security problems, there are other problems which need to be addressed, such as those exacerbated by a low band-width connection to the browser, or access to undesirable information.

There is a need for an improved method of accessing and retrieving information in a networked data communications system. There is also a need for an improved proxy for accessing and retrieving information between a networked data communications system and a browser.

DETAILED DESCRIPTION OF THE DRAWINGS

Figure 1:
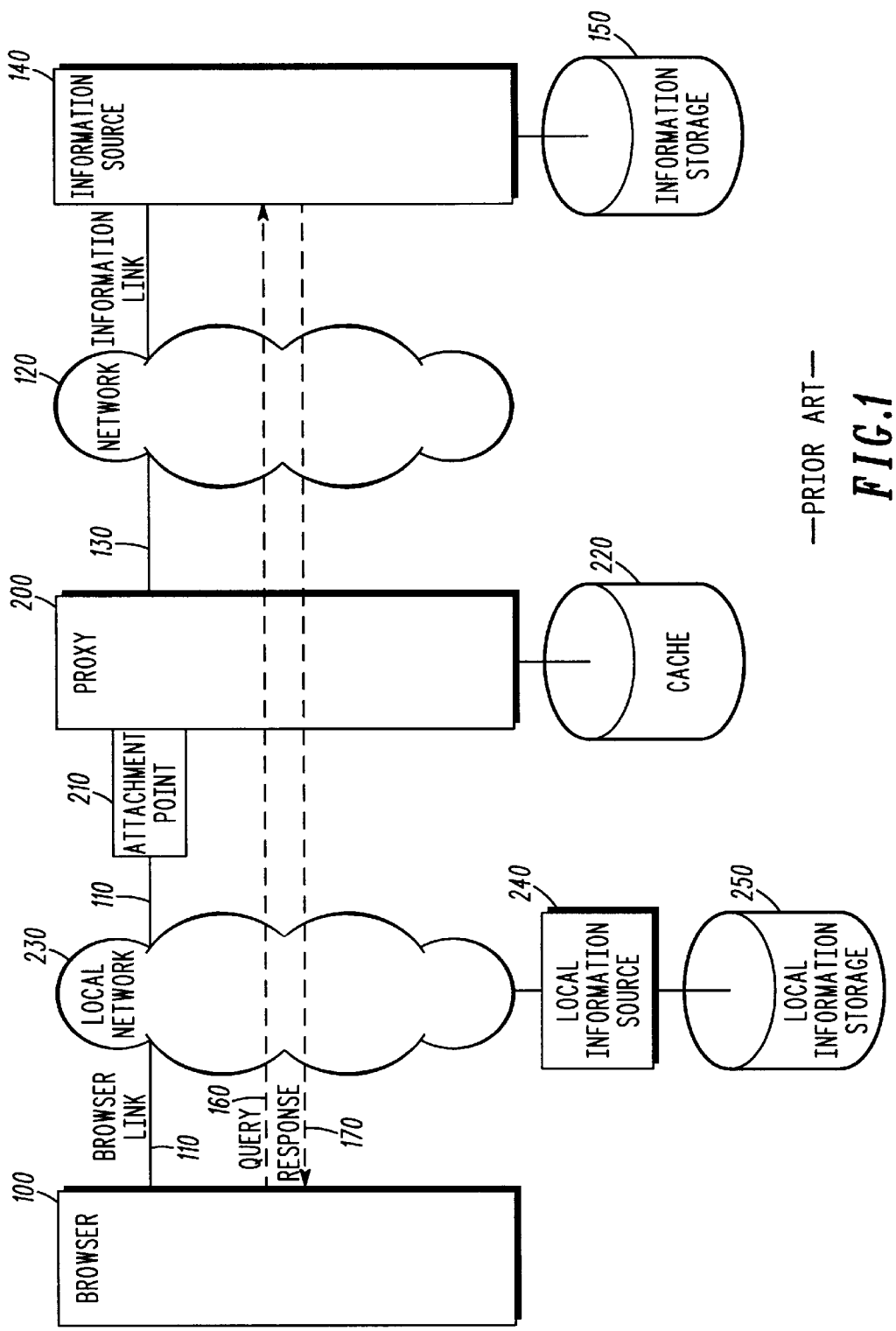
FIG. 1 is a system diagram of a typical prior art networked data communications system which includes a proxy.

FIG. 1 illustrates components of a typical networked data communications system. A browser 100 is connected to an information source 140 via a browser link 110, a network 120 and an information link 130. Together the browser link, network and information link form the communication channel. A local network 230, a local information source 240, a proxy 200, a proxy attachment point 210, and a cache 220 are shown.

The browser 100 is connected to the local network 230 via the browser link 110 and exchanges information with attached local information source 240 via this link. The local information source 240 retrieves the information from the attached local information storage device 250 and sends it back to the browser via the browser link 110. Information exchanges between the browser and the local information source do not pass through the proxy.

Information exchange is effected by sending requests or queries and responses between the browser and the information source via the communication channel. For example in FIG. 1, a browser sends a query 160 over the communication channel for information which is located at the information source 140. The information source 140 retrieves the information from the attached information storage 150 and sends the response 170 (i.e., the retrieved information) back to the browser via the communication channel.

The communication channel from the browser 100 to the information source 140 is established by passing through local network 230 to the proxy 200. The browser connects to the proxy via an attachment point 210 (e.g., a port on the host computer). Queries 160 from and responses 170 to the browser are via the attachment point. A cache 220, which may be used to store copies of recently received information responses from the information source, is attached to the proxy.

Access to the Internet is often provided by a service provider which may charge the user a fee based on the amount (e.g., kilobytes) of data transferred. When a user clicks on an HTML link the physical size of the information requested is not provided in advance to the user. As a result, users may unwittingly request and receive very large quantities of data (e.g. image files) in which they may have only a passing interest, or which may contain material they would like to filter out (e.g. pornography), and for which they may be charged. It would be desirable if, at the user's request, a proxy could reduce in some fashion the amount of the information before it is delivered to the user's browser. It would also be desirable if the proxy could provide to the browser an advance indication of the characteristics (e.g., size, content, etc.) of the information before it is transferred.

Very little information about the capabilities of the browser is available to the proxy. For instance, a user may request an HTML document that contains tables or forms, but the browser may not be capable of displaying such data. In this a case the user would have to pay for data which would be unrecognizable by the browser and would be useless to the user. It would be desirable if the proxy could determine in advance the capabilities of the browser.

The user has no means of requesting and selecting different services such as filtering from the proxy. For instance, a browser may contain the ability to compress and un-compress information and the user may want to use that capability when transferring HTML data. In another instance, the proxy administrator may want to provide a service to the users of the proxy which prohibits the access of minors to specific servers. At present there is no means for the user to request such special or enhanced services from the proxy. It would be desirable if the user could be provided with a means by which to select the proxy services they want to use.

These problems are not of equal concern to users of a traditional wireline network and users of a wireless radio network. In particular, the above problems are exacerbated in a wireless network, where the bandwidth is limited, data transfer rates over the browser link are relatively slow, and where data transfer charges are comparatively high. Therefore, there remains a need for an improved means of accessing and retrieving data in networked data communications systems and more particularly from the Internet or Web that solves these and related problems.

The following description provides various methods of accessing and retrieving information via an enhanced proxy in a networked data communications system having an infrastructure, an information source, and a browser coupled by communication channels. A first aspect of the invention provides a method for accessing and retrieving information via an enhanced proxy over communication channels established between a browser and an information source, including a means of modifying the information by the proxy according to user selected filtering services.

In accordance with a second aspect of the invention, means are provided for the browser to establish and select the filtering services to be used by the proxy when processing queries and responses on behalf of that browser. This may be accomplished in several ways which may be used independently or in combination with each other.

According to a first embodiment, a specific set of filtering services is associated with a particular proxy attachment point (e.g. a physical port number). A browser selects the set of filtering services associated with an attachment point by using that attachment point to communicate with the proxy.

According to a second embodiment, the browser uses the content and/or format of the query to select the set of filtering services to be used by the proxy. For example, by using an enhanced format query the browser implicitly requests enhanced format responses.

According to a third embodiment, the browser selects filtering services by querying specific information. For example, the proxy has associated with it an information source which contains Web pages that describe the filtering services provided by the proxy. A browser might request these pages in order to enable or disable particular filtering services.

According to a fourth embodiment, the proxy has associated with it an information source which contains forms for selecting filtering services. The user selects the desired filtering services by fetching a form and completing and returning it to the proxy information source via the browser.

According to a further aspect of the invention, methods are provided for the proxy to filter the requested and/or retrieved information. Two classes of filtering services are employed by the proxy: filtering of the query received from the browser prior to forwarding it to the information source; and filtering of the response received from the information source before forwarding it to the browser. The techniques employed for both query and response filtering are devised to improve the efficiency of the use of the formatting and protocol conventions (e.g., HTTP and HTML). Efficient use of these conventions is important because the browser link may be a limited bandwidth resource, such as an RF channel.

According to a still further aspect of the invention, a mechanism is provided whereby the proxy can send an advance indication of the characteristics of the information requested by the browser. Annotation of files size, content characteristics (e.g., text, image, video, etc.), content classification (e.g., suitable for children, adults only, etc.), may be passed on to the browser by the proxy. The proxy does this, for example, by fetching the information requested by the browser, analyzing it, creating a response containing the results of the analysis, and forwarding it to the browser.

Additionally the proxy and the browser are able to process enhancements to standard formatting and protocol conventions (e.g., HTML and HTTP). For example, the HTML protocol may be extended by re-encoding the HTML tags to become more efficient, or the HTTP protocol may be extended to provide support for an "open" proxy session link for data transmission. Support of such enhancements is important as they would improve the efficiency of Web browsing in both wireless and wireline networks.

Figure 2:
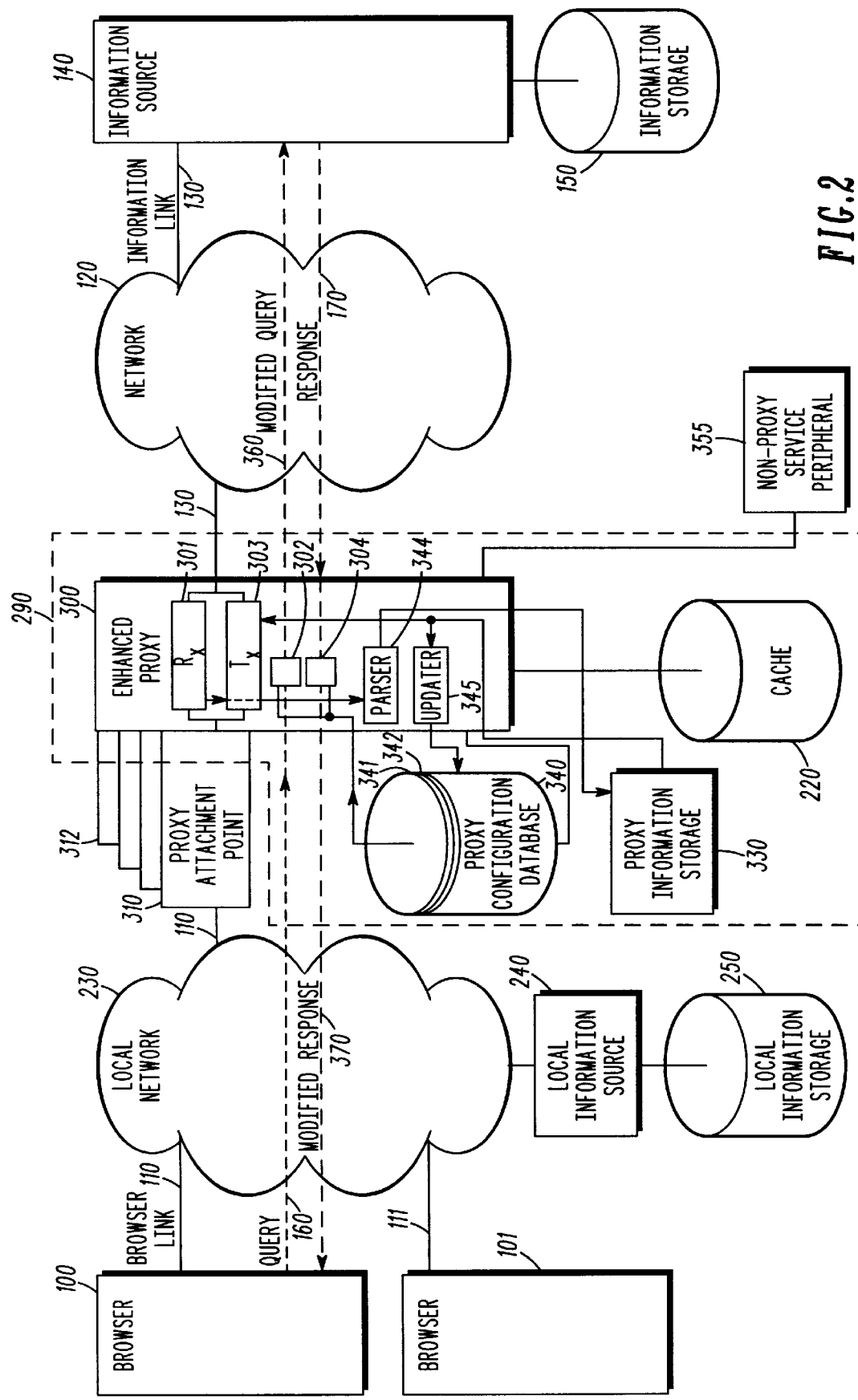
FIG. 2 is a system diagram of a networked data communications system including an enhanced proxy according to the preferred embodiment of the present invention.

Turning now to FIG. 2, there is generally depicted a networked communication system in accordance with a first embodiment of the invention. The system shown includes two browsers 100 and 101 (and will typically have many browsers) coupled to an enhanced proxy 300 via browser links 110 and 111 respectively, a local network 230, and one or more proxy attachment points 310, 312. The enhanced proxy 300 is coupled to a proxy information storage 330, a proxy configuration database 340, a cache 220, an information source 140 (via an information link 130) and a network 120. The information source 140 is similarly coupled to the network 120, via the information link 130, as well as to an information storage device 150.

The enhanced proxy 300 is a processor and incorporates, in software, a receive module 301, a send module 303, a query filter 302, a response filter 304, a parser 344 and a database updater 345 as well as other elements which need not be described in detail. All the various couplings between the elements in enhanced proxy 300 are not shown in full, for the sake of simplicity of explanation. Query filter 302 and response filter 304 are coupled between receive module 301 and send module 303, but are illustrated aside from these modules for simplicity of explanation. Also, a direct link is selectively provided (not shown) from receive module to transmit module for selectively passing unfiltered queries and responses between these modules.

Query filter 302 filters queries received from the browsers 100 and 101. Response filter 304 filters responses from the information storage 140 to the browsers 100 and 101. The filters are implemented in software and are coupled to and responsive to files in the proxy configuration database 340, the database 340 having a file 341, 342, which is specific to each of the browsers 100 and 101.

Parser 344 parses queries received at receive module 301 and in response to receipt of certain queries, parser 344 causes a look-up of information in proxy information storage 330 (or, through connections which are not illustrated, it causes a look-up of information in proxy configuration database 340 or in cache 220). In response to certain queries or forms received at receive module 301, parser 344 causes updater 345 to update database 340, as is described in greater detail below. Parser 344 also parses responses from information link 130.

The proxy configuration database maintains the files 341, 342 etc., each file including a set of services associated with a corresponding browser 100, 101 for identifying the method of filtering to apply to a query as a function of the services associated with the particular browser. The proxy information source can contain a variety of information. The proxy information storage 330 contains messages or pages for sending to a browser. It also contains forms for sending to the browser or configuration update pages which the browser can request.

These details are described in greater detail below. A database updater 345 is provided, coupled to the proxy information source and the proxy configuration database, which is primarily a "write" operator for updating the proxy configuration database 340 when certain interactions occur between the browser 100 and the proxy processor 320, described in more detail below.

An optional non-proxy service peripheral device 355 is provided, such as a fax machine or paging message generator.

In the preferred form: the browser 100 is a personal computer (PC) fitted with a radio frequency (RF) modem and communications software running a standard browser program such as Netscape (trade mark); the browser link 110 is a low speed data link such as a 19.2 Kbit/second radio data channel; the local network 230 is a wireless RF network such as an ARDIS (registered trade mark), DataTAC (registered trade mark) or CDPD network; the proxy attachment points 310, 312 are ports on a host computer 290, otherwise referred to as a "server"; the enhanced proxy 300 is an application program running on the host computer 290; the proxy information storage 330 is a mass storage device such as a hard disk drive; the proxy configuration database 340 is a database application program such as Sybase (registered trade mark) running on the host computer 290; the cache 220 is a short-term high-speed temporary storage area accessible by the enhanced proxy 300; the information link 130 is a high speed data link such as a T-1 link; the network 120 is a packet switched public data network such as the Internet; the information source 140 is a server such as a web-server; and the information storage 150 device is a mass storage device such as a hard disk drive. Together the browser link 110, local network 230, proxy attachment point 310, enhanced proxy 300, network 120 and information link 130 form a communication channel between the browser 100 and information source 140 over which information may be exchanged.

Information exchange between the browsers 100 and 101 and the information source 140 is facilitated by sending queries 160 and responses 170 through the enhanced proxy 300 via the communication channel. The purpose of the enhanced proxy is to modify a query 160 and/or response 170 according to a set of filtering services that the browser has established. Therefore, when a query 160 is received on the proxy attachment point 310, the query is channeled through the enhanced proxy 300 to be modified according to the filtering services established with the proxy for that browser. The modified query 360 is then forwarded by the enhanced proxy on to the information source 140 via the communication channel. This process is described in more detail below with reference to FIG. 3.

On receiving the modified query 360, the information source 140 fetches the requested information from the attached information storage 150 device and sends the response 170 back to the enhanced proxy 300 via the communication channel. The response filter 304 of the enhanced proxy 300 modifies the response according to the set of filtering services established for the browser, possibly storing all or part of the modified response 370 on the proxy information storage 330 device, and sends the modified response 370 back to the browser. This process is described in more detail below with reference to FIG. 4.

While FIG. 2 depicts only one local network, one local information source, one local information storage, one enhanced proxy, one proxy configuration database, one proxy information source, one proxy information storage, one cache, one network, one information link, one information source and one information storage device, a practical system may include a plurality of each. Also a practical system may have fewer or more than two browsers, two browser links and two proxy attachment points. Although FIG. 2 portrays a preferred system, the arrangement is expected to have equal applicability to both wireline and wireless data communications systems. Additionally the invention is expected to have applicability to data communications regardless of the specific form the browser or network may take.

Figure 3:
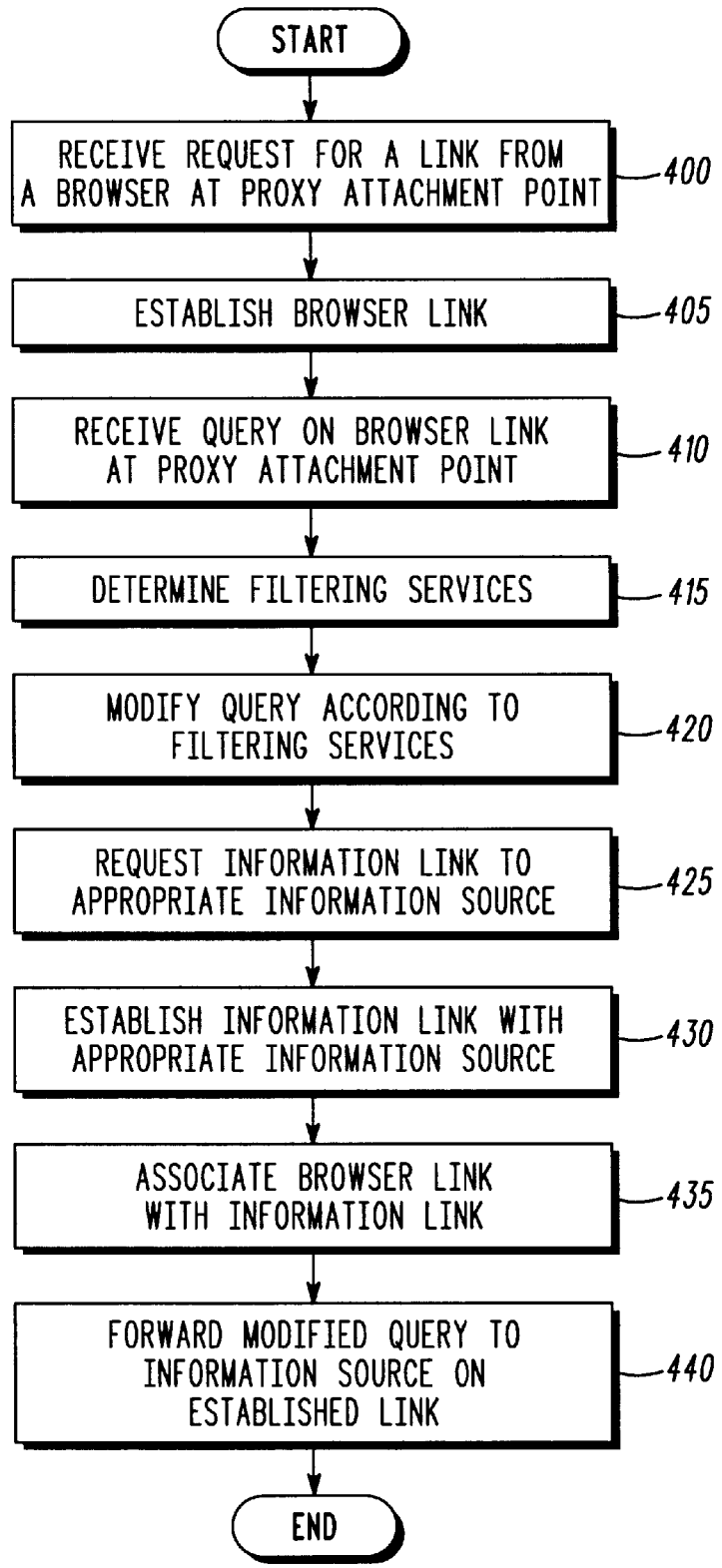
FIG. 3 is a flow chart describing the processes required to access information via an the proxy of FIG. 2.

Referring to FIG. 3, the process of accessing information via an enhanced proxy is illustrated, beginning at step 400. At this step the enhanced proxy 300 receives a query 160 from a browser 100 at the proxy attachment point 310. The query 160 contains a request from the browser to establish a communication link with the enhanced proxy 300 via the proxy attachment point 310 and browser link 110. At step 405 the enhanced proxy 300 responds by establishing the requested link with the browser. It should be noted that steps 400 and 405 are characteristic of the current industry standard methods of establishing communications between a browser and a proxy and as such, further details of these steps are not necessary for an understanding of the invention. The process of accessing information continues at step 410 when the browser sends a query 160 for information via the browser link 110 to the enhanced proxy 300, and the proxy receives this request at the proxy attachment point 310. Each proxy attachment point 310, 312 has a set of filtering services defined for it, which are described in greater detail below. When the browser 100 communicates with the enhanced proxy 300 via a specific proxy attachment point, e.g. attachment point 310, the filtering services which are defined for that attachment point will be applied to both the queries and responses for that particular browser. Processing continues at step 415 when the proxy determines the filtering services to be applied to the query. From step 415 the proxy proceeds to step 420. At step 420 the proxy has ascertained the set of filtering services which are to be applied to the query. Application of the filtering services to the query is carried out by the query filter 302 resulting in the modified query 360.

The modifications to the query (described below) are dependent on the filtering services established for the browser as obtained from step 415, and that the modified query may or may not result in retrieval of the information as originally requested by the query in step 410. It should be noted that at the conclusion of step 420 the modified query 360 will contain the URL of the appropriate information source (i.e., the URL of the originally requested information source, or some other URL as determined by the filtering services).

By way of example, the case is considered where the URL of the modified query 360 indicates the information is located at information source 140. At step 425 the proxy requests a link to be established with the information source 140. Next the proxy proceeds to step 430 and establishes the information link 130 between the enhanced proxy 300 and the information source 140. Step 435 ensures that the proxy associates the browser link 110 established in step 405 with the information link 130. That is to say the proxy records the proxy attachment point (i.e., port number) and the browser ID which is connected to that attachment point for this specific communication session. This mapping (i.e., the browser ID to proxy attachment point) is recorded in configuration database 340 so that the proxy may process multiple, concurrent browser sessions. Finally, at step 440 the enhanced proxy 300 forwards the modified query 360 via the information link 130 to the information source 140. Step 440 ends the processes associated with accessing an information source via a query.

Figure 4:
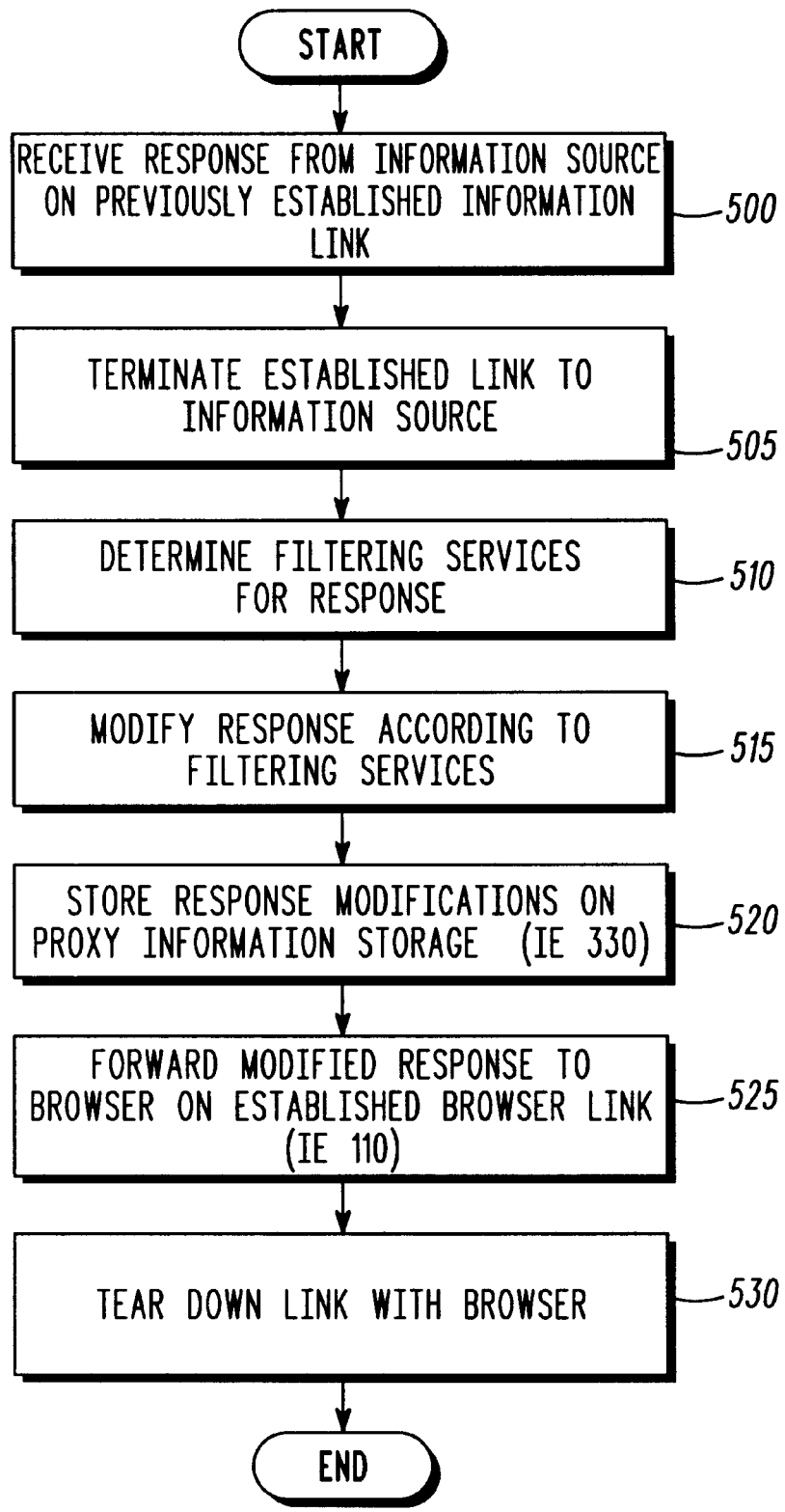
FIG. 4 is a flow chart describing the processes required to retrieve information via an enhanced proxy.

Before proceeding to descriptions of methods of modifying the queries and responses, there first follows a description of the process of retrieving the requested information with reference to FIG. 4. Beginning at step 500, the enhanced proxy 300 receives a response 170 to the modified query 360 from the information source 140. The response is sent via the information link 130 previously established at step 430 in FIG. 3. Once the enhanced proxy has received the response the link between the proxy and the information source no longer needs to be maintained and can be terminated. Step 505 terminates the information link 130 between the enhanced proxy 300 and the information source 140. Processing continues at step 510 when the proxy determines the filtering services to be applied to the response 170. The determining of the filtering services is described below. From step 510 the proxy proceeds to step 515. At step 515 the proxy has ascertained the set of filtering services which are to be applied to the response. Application of the filtering services to the response produces the resultant modified response 370. Like the modifications to the query, the modifications to the response are dependent on the filtering services established for the browser as determined in the previous step. The modifications to the response are described below and may be relatively minor or fairly extensive. These modifications are carried out by the response filter 304 of the enhanced proxy 300 and stored on the proxy information storage 330 by the proxy for future reference by the browser. This occurs at step 520.

Once the modifications have been made to the response, step 525 forwards the modified response 370 to the browser 100 via the browser link 110 as described above with reference to step 405 of FIG. 3. Once the browser receives the modified response the link between the enhanced proxy 300 and the browser 100 no longer needs to be maintained. Step 530 ends the process by terminating the browser link 110, thus concluding the processes associated with retrieving information via an enhanced proxy.

Figure 5:
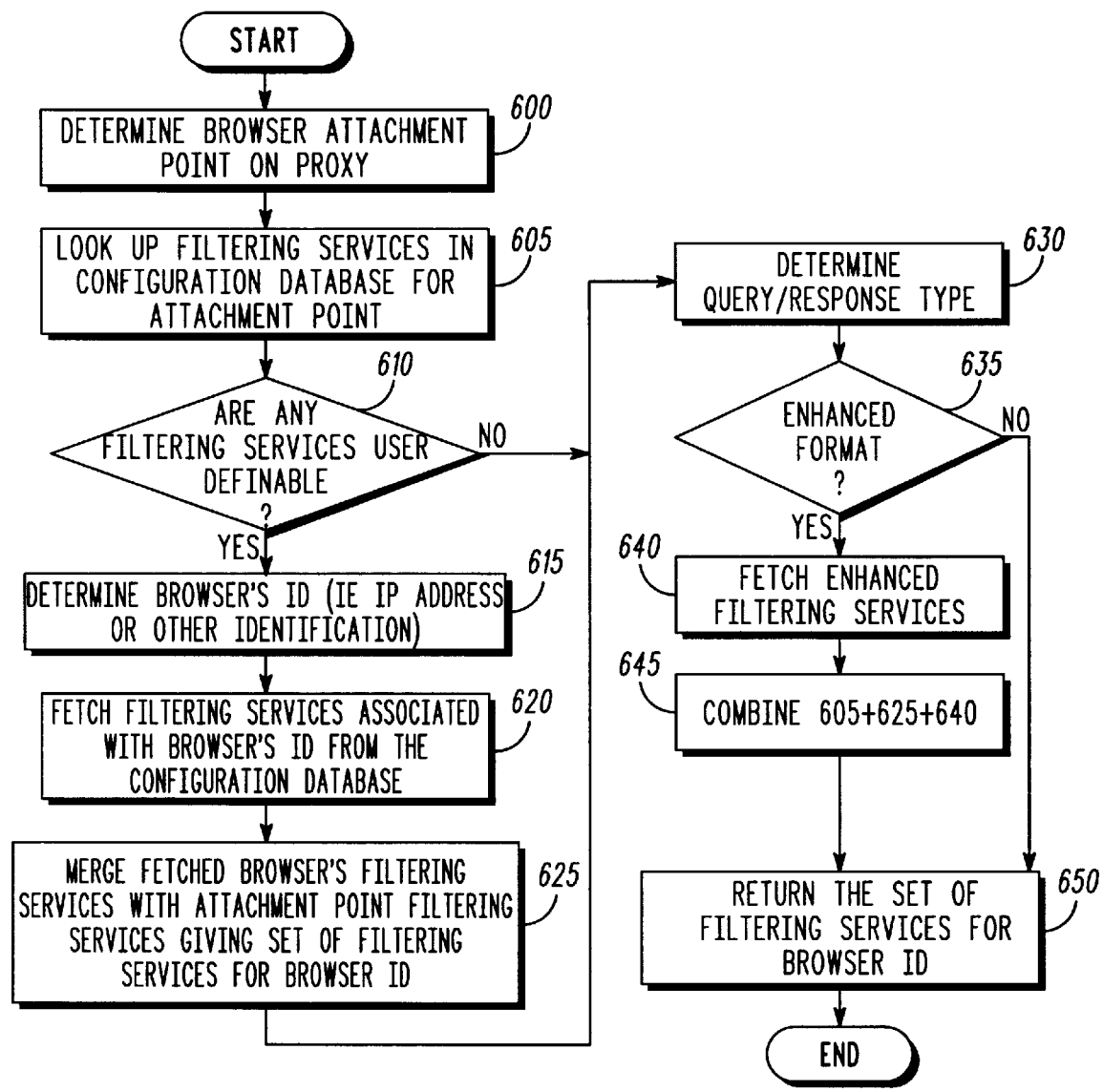
FIG. 5 is a flow chart describing the processes required to determine the filtering services to be used by the enhanced proxy.

The process of determining the set of filtering services to apply to a query and/or response is more fully described by referring to FIG. 5. The filtering services and the associated filtering techniques are ascertained from one or more of four sources of information available to the enhanced proxy: from the browser identification (ID); from the proxy attachment point; from the format of the query and/or response; and from the proxy configuration database.

The proxy configuration database 340 is implemented in such a manner so as to facilitate a table look-up or other similar mechanism which maps the proxy attachment point and/or the browser ID to the filtering services defined in the database for that browser.

Referring now to FIG. 5, the process of determining the filtering services begins at step 600. At step 600 the proxy determines the proxy attachment point (i.e., port number) to which the browser is connected for this specific communication session. Next the proxy proceeds to step 605 where the enhanced proxy 300 uses the proxy attachment point 310 as a parameter to look up the filtering services in the proxy configuration database 340 defined for that attachment point. Having retrieved the filtering services for the proxy attachment point, the proxy proceeds to step 610. At this step the proxy determines if any of the fetched filtering services may be altered by the user (i.e., the filtering services are user definable). If any of the filtering services are user definable, the proxy proceeds to step 615. If none of the filtering services is user definable, the proxy proceeds to step 630.

Assuming there are user definable filtering services, the proxy proceeds with step 615 and ascertains the identity of the browser (i.e., browser ID) from the query 160 and/or response 170. Methods by which the identity of a browser may be uniquely determined include: using the browser's Internet Protocol (IP) address; using an identification number assigned by the proxy service provider at the time of registration for the service; or any other such similar method. Next, at step 620, the browser ID is used as a parameter to look up the filtering services in the proxy configuration database 340 defined for that browser. Finally, at step 625 the filtering services defined for the proxy attachment point as fetched in step 605 are merged with the filtering services defined for the browser ID as fetched in step 620 to produce a set of filtering services for the browser ID.

Proceeding to step 630, the proxy determines the type of query and/or response it has received at step 410. The query type is determined by the capabilities of the browser: those which adhere to standard HTML and HTTP protocols and conventions (e.g., as generated by Netscape (trade mark)) are referred to herein as standard browsers and generate standard format queries or responses; those which are characterized by enhancements such as those defined herein are referred to as enhanced browsers and generate enhanced format queries or responses.

At step 635 the proxy proceeds by checking the format type the query or response. If the query or response indicates the enhanced format, then the proxy proceeds to step 640, otherwise if the query or response is standard format, then the proxy proceeds on to step 650. From step 635 the processing proceeds to step 640 where the proxy fetches the filtering services for enhanced format queries or responses from the proxy configuration database 340. Next at step 645, the filtering services as fetched in steps 605, 620, and 640 are merged to produce a set of filtering services for the browser ID. Finally, at step 650, the complete set of filtering services defined for the browser ID (i.e., as determined at steps 605, 625, or 645 respectively) are returned to the calling procedure (i.e., either step 415 of FIG. 3 or step 510 of FIG. 4).

Thus it has been described how an aspect of the invention enables a user to request special or enhanced services from the proxy. Several specific means are now described by which to select the proxy services the user wishes to use with reference to FIGS. 6 through 8. Various specific methods of configuring the enhanced proxy to establish the filtering services to be supported by the enhanced proxy are described in these figures. Additionally various methods by which the browser may select the supported filtering services are also described.

A first method of establishing proxy filtering services involves associating a set of filtering services with a particular proxy attachment point (i.e., a physical port number). In this method, the filtering services are established by the proxy service provider (PSP) which determines the type of filtering services that will be supported and the proxy attachment points 310 that will be associated with those services. For each proxy attachment point 310, an entry is created in the proxy configuration database 340 which defines the supported filtering services. The proxy attachment point 310 is used as a parameter to look up the entry in the proxy configuration database which defines the filtering services. Step 605 in FIG. 5 illustrates this process.

A specific embodiment of this method takes into consideration the capabilities of the browser (i.e., standard vs. enhanced) when providing different levels of filtering service for each proxy attachment point. For example, if the enhanced proxy has two proxy attachment points, then the filtering services for one proxy attachment point is, for example, defined for standard browsers, and the other for enhanced browsers.

It should be noted that the enhanced proxy does not impose any particular type of filtering service. Rather, mechanisms are provided, described below, which enable the definition and association of filtering services with the proxy attachment points. Consideration of the capabilities of the browser is important as it allows the proxy service provider to choose filtering techniques which are optimized for a particular browser type.

For example, it does not make sense to implement data compression for all browser queries unless the requesting browser supports compression. To do so would result in transmission of undecipherable information to the browser. The converse is also true, it is futile for the browser to request filtering services which it cannot handle. In such worst-case scenarios, wasted traffic communications (i.e., data which must be discarded) would not provide the desired improvement in channel utilization. The ability to define filtering services for proxy attachment points which are optimized according to the capabilities of the browser provides a simple solution to improving channel utilization.

It should be noted that the information pertaining to the type of filtering associated with each proxy attachment point is supplied to subscribers by the PSP when they register for the service. The user selects the set of filtering services associated with a proxy attachment point (e.g. standard vs. enhanced) by using that attachment point to communicate with the enhanced proxy. The proxy attachment point determines the filtering services which are applied to the queries and/or responses of the browsers utilizing that particular port. Since the user is given information pertaining to the type of filtering service for each proxy attachment point, he is capable of changing the proxy attachment point that he is attached to as it suits his needs and purposes.

A second method of establishing and selecting proxy filtering services utilizes the content and/or format of the browser query to select the set of filtering services to be used by the proxy.

In the case of utilizing the content of the browser query, the enhanced proxy employs standard data processing parsing techniques to extract the content of the query. The extracted content of the query is then evaluated to determine if it is a request to select or modify the filtering services that are defined in the proxy configuration database for that browser ID. This type of query is referred to as a configuration query, and is directed to the enhanced proxy itself for the specific purpose of selecting and/or modifying the filtering services for a browser.

In the case of utilizing the format of the browser query, the enhanced proxy again employs standard data processing techniques to determine the format of the query. If it is determined that it is an enhanced format query then this implies that the proxy should formulate responses to the browser also utilizing enhanced formatting.

Figure 6:
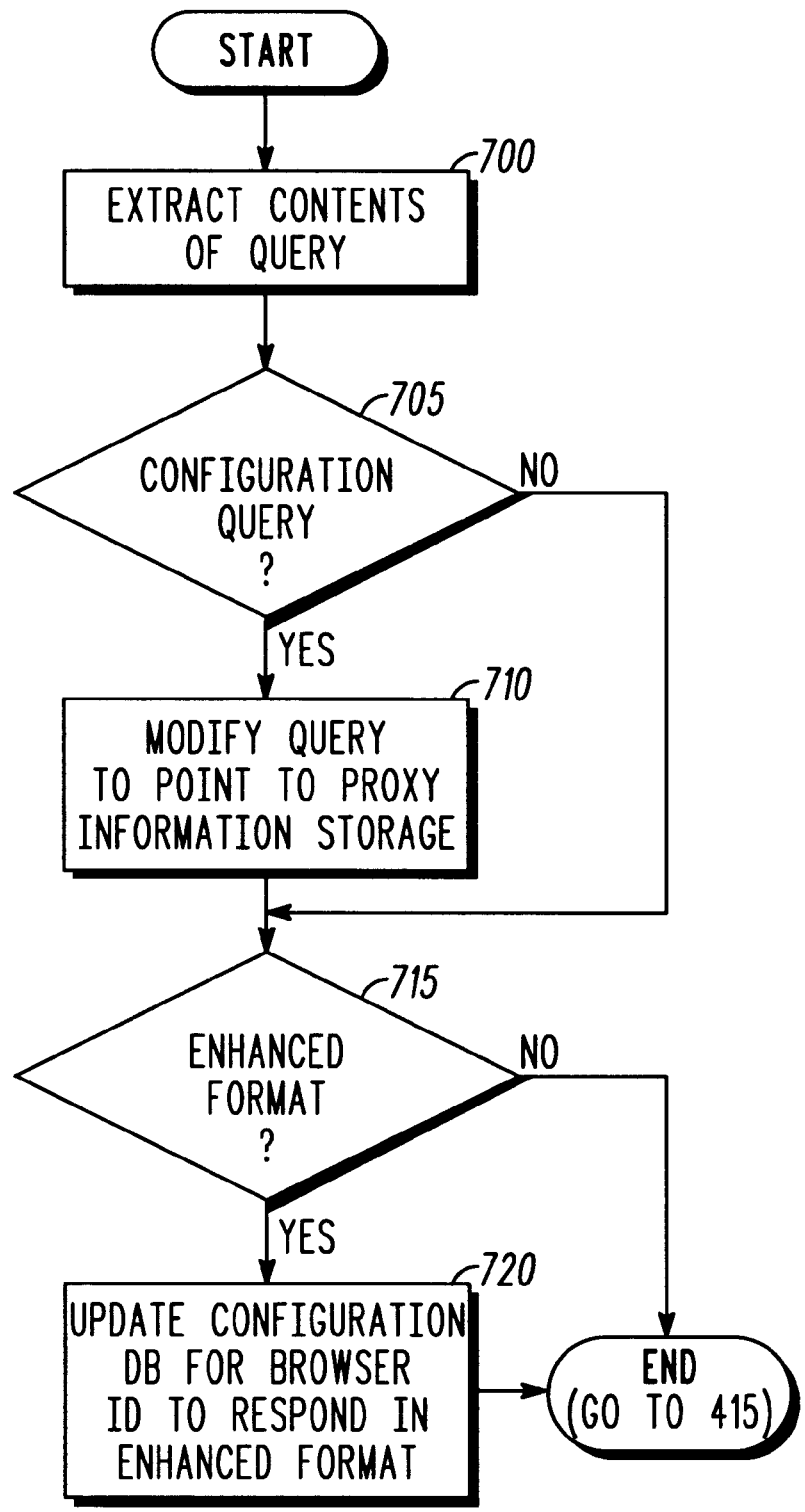
FIG. 6 is a flow chart describing the processes required to establish the filtering services from the content and/or format of a query.

The process of establishing and selecting proxy filtering services via the content and/or format of the browser query can be more fully appreciated by referring to FIG. 6. The processes described by FIG. 6 are inserted after step 410 and before step 415 of FIG. 3. At step 410 of FIG. 3, the query 160 has been received by the enhanced proxy 300 at the proxy attachment point 310. At step 700 of FIG. 6, the enhanced proxy 300 utilizes standard data processing parsing techniques to extract the contents of the query 160 as received in FIG. 3 step 410. Next, at step 705, the extracted query contents are evaluated to determine if this is a configuration query. If this is a configuration query, processing continues at step 710, otherwise processing continues at step 715. In order to retrieve the configuration information maintained by the proxy information storage 330, the query is modified at step 710 so that it is directed to the aforementioned information source.

At step 715 the extracted contents of the query are again evaluated to determine if it is an enhanced format query (i.e., as generated by an enhanced browser). If it is an enhanced format query, processing continues at step 720, otherwise processing returns to continue at step 415 of FIG. 4.

At step 720 the entry in the proxy configuration database 340 for the specific browser ID is modified so that all responses for this browser are formulated in enhanced format. The establishment and selection of filtering services via the content and/or format of a query concludes at step 720, and processing returns to continue at step 415 of FIG. 3.

A third method of establishing proxy filtering services involves querying a page of configuration information on the proxy configuration database to establish the filtering services for the particular browser.

In this method the proxy service provider pre-defines one or more HTML format configuration pages which reside on the proxy information storage 330. Each HTML configuration page contains information about the type of browser supported (i.e., standard vs. enhanced), and a description of the filtering services associated with and defined for that page. An entry corresponding to each configuration page is also created in the proxy configuration database 340 which describes the filtering services for each such page. A list of the browser IDs that have requested specific configuration pages is also associated with each configuration database entry. A simple example of a configuration page would be one which was defined by the PSP to be a default configuration page. The default configuration page describes the basic or default level of filtering services which is to be used by all proxy subscribers until they otherwise initiate a change.

Utilizing this method the user selects the filtering services to be used by sending a query 160 to the enhanced proxy 300 requesting a configuration page which is stored on the proxy information storage 330. The enhanced proxy responds by returning the requested configuration page, noting which configuration page was accessed and the browser ID requesting the information in the configuration database 340.

This method of configuring the proxy is based on the assumption that, given an initial default level of filtering service, the user will change the filtering services to suit his needs. On registration for the enhanced proxy service from the PSP, the user is provided with a description of the types of browsers supported and filtering services for the default configuration page, as well as a description of the proxy's additional configuration pages and associated filtering services that may be obtained at the user's request. If the user wishes to change the default filtering services, he requests the additional filtering services by using his browser to access the desired configuration page containing the described filtering services. It should be noted that it is the act of requesting a specific configuration option page which causes the proxy to re-define the filtering services for that user in the proxy configuration database.

Figure 7:
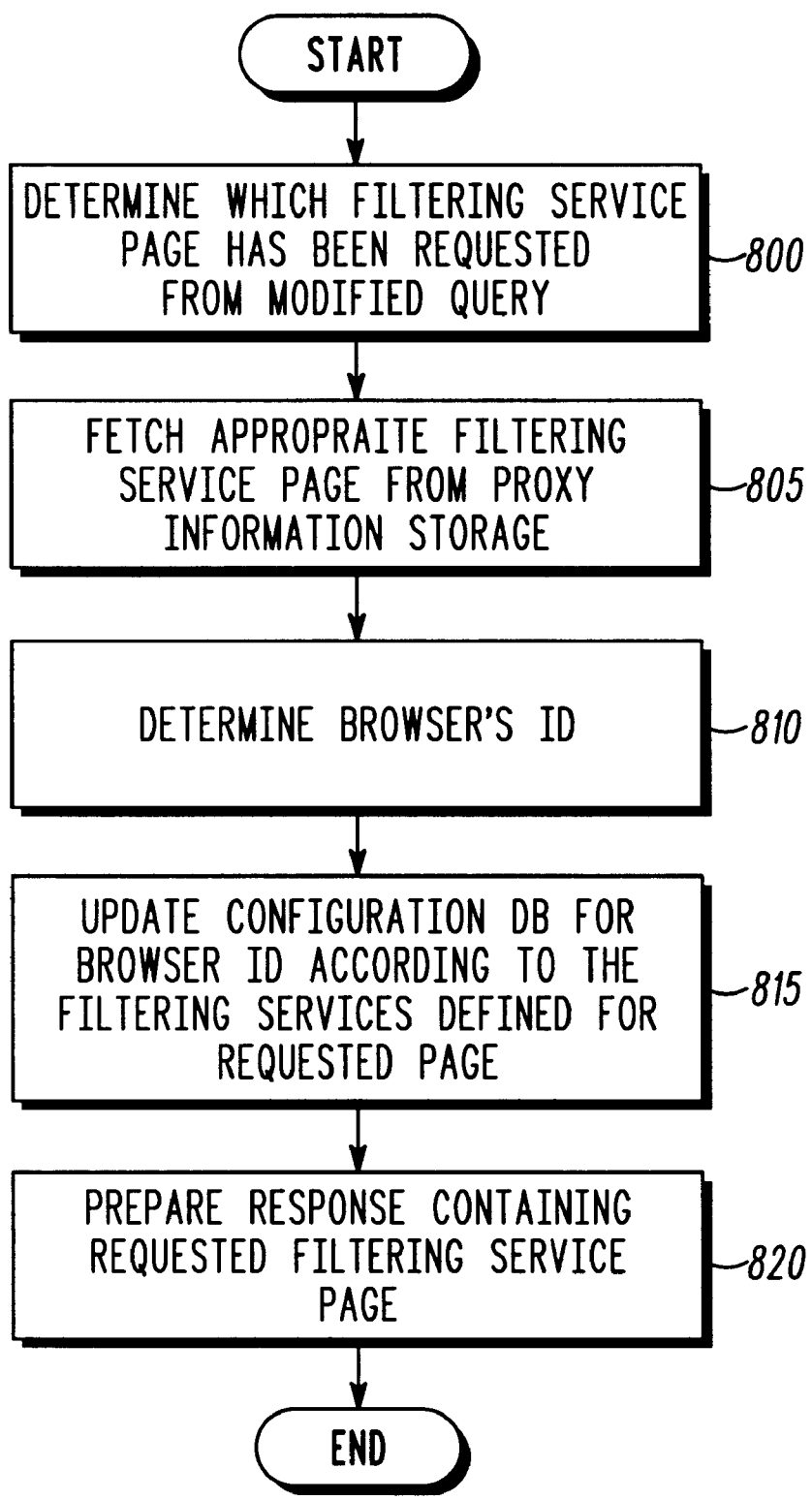
FIG. 7 is a flow chart describing the processes required to establish the filtering services by querying a page of configuration information.

The process of establishing and selecting proxy filtering services by querying a page of configuration information on the proxy configuration database can be more fully appreciated by referring for FIG. 7. The process described here also begins at step 410 when the query 160 has been received by the enhanced proxy 300 at the proxy attachment point 310. The process illustrated in FIG. 7 is inserted after step 410 and before step 415 of FIG. 3.

At step 800 of FIG. 7 the enhanced proxy 300 determines which configuration page has been requested by the browser. Proceeding to step 805 the proxy retrieves the requested configuration page from the proxy information storage 330. Next, at step 810, the browser ID is determined. As mentioned previously, a browser request for a particular configuration page will cause the proxy to re-define the filtering services for that browser in the proxy configuration database 340. This is accomplished in step 815. Next, at step 820 the proxy prepares a response containing the retrieved configuration page to be sent to the browser, as described above with reference to FIG. 4.

A fourth method of establishing proxy filtering services involves a fetching and responding to a configuration form located on the proxy information source to establish the filtering services for the particular browser. As for the method described with reference to FIG. 7, the proxy service provider pre-defines an HTML configuration form which resides on the proxy information storage 330. The HTML configuration form contains information about the types of browsers supported (i.e., standard vs. enhanced), and a description of the filtering services offered. However, this method contrasts with that described above with reference to FIG. 7 in that a comprehensive description of all the filtering services supported by the proxy are located on a single HTML configuration form rather than on multiple HTML configuration pages.

For each subscriber (i.e., browser ID) of the proxy service, an entry is created in the proxy configuration database 340 which describes the filtering services selected for that browser ID as are described by the options chosen on the configuration form. When a user subscribes to the proxy service he is provided with an initial default level of filtering service, and is entered as such in the proxy configuration database 340. The default level of filtering service is given on the configuration form via a pre-defined series of options which are entered on the configuration form. This level of filtering service is used by all browsers until they initiate a configuration change.

Like the method previously discussed with reference to FIG. 7, this method is based on the assumption that, at registration the subscriber is given instructions on where and how to obtain the configuration form (i.e., given the URL for accessing the proxy information storage 330). The user initiates a change in his level of filtering service by requesting and fetching the configuration form from the proxy information storage 330, completing the form (i.e., he responds to the questions posed regarding the capabilities of his browser, the filtering services desired, etc.) and returning the completed configuration form via his browser to the enhanced proxy 300. The procedures used to facilitate this process are already described above with reference to FIG. 2.

Figure 8:
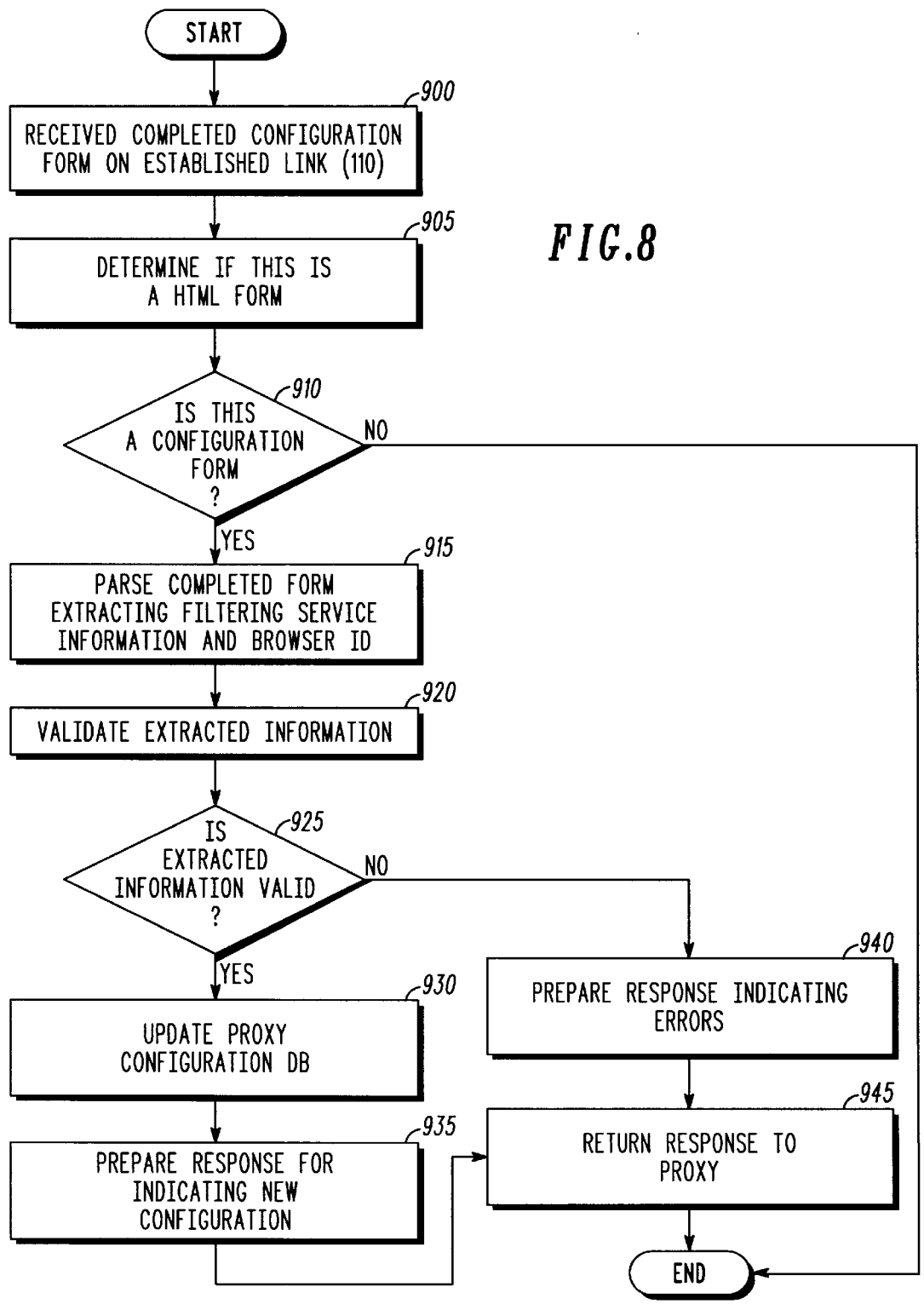
FIG. 8 is a flow chart describing the processes required to establish the filtering services by fetching and responding to a configuration form.

The process of selecting the filtering services via the completed configuration form can be more fully appreciated by referring to FIG. 8. The process begins at step 900 when the completed configuration form (i.e., query 160) has been received on the browser link 110 at the proxy attachment point 310. Next at step 905 the enhanced proxy determines if the query 160 contains an HTML form by checking for HTML formatting commands that denote an embedded form. Proceeding to 910 the proxy checks if this is it's configuration form. If it is, then step 915 follows. If it is not a configuration for the forms configuration procedure ends and the proxy continues on with further processing of the query. Having received a configuration form, processing continues at step 915. Here standard data processing techniques are employed by parser 344 to extract from the completed form the browser ID and the filtering services selected. At step 920 the extracted information is validated. For example, the browser ID verified as being a legitimate proxy service subscriber. At step 925 the validity of the extracted information is checked. If the extracted information is valid, processing continues to step 930. Step 930, for the browser ID determined from the configuration form, the proxy configuration database 340 is updated with the filtering services as extracted from the configuration form. At step 935 a response is prepared for the browser which will contain confirmation of the newly defined filtering services as contained in the proxy configuration database. Processing continues at step 945.

If, at step 925 the extracted information is not valid, a response is prepared for the browser which indicates the errors that were detected. Processing continues at step 945 where the response is returned to the enhanced proxy which will use the procedures described above with reference to FIG. 4 to return the response to the browser.

This particular method is generally only appropriate for forms-compatible browsers. If the browser does not support forms, one of the previously mentioned methods is utilized.

While four different means of establishing filtering services on the proxy have been presented, the methods presented here are not mutually exclusive of each other. Rather, the configuration methods described for the enhanced proxy have been created so that they can be used alone or in combination with each other as determined by the proxy service provider.

There now follows a description of the modifying of a query received from the browser prior to forwarding it on to the information source. (Below is described the modifying of the response received from the information source before forwarding it on to the browser.) Employment of query modifying does not preclude the use of response modifying and vice versa. Both classes of modifying are designed to be used as determined by the enhanced proxy according to the filtering services defined in the proxy configuration database for the specific browser ID.

The specific modifying techniques presented here are devised to improve the efficiency of the use of the formatting and protocol conventions (e.g., HTTP and HTML). Efficient use of these conventions is important because the browser link may be a limited bandwidth resource such as an RF channel.

For a network operator employing an enhanced proxy, an increase in channel efficiency means that a greater number of subscribers can simultaneously access the network which in turn means improved network operator revenue. For the subscriber, an increase in channel efficiency results in a corresponding improvement in access time and cost. Such improvements lead to improved customer satisfaction, which in turn also serve to increase the revenue of the network To explain query modifying, there now follows a brief description of the format and structure of the Uniform Resource Locator (URL). The purpose of a URL is to indicate where a file is located on the Web. The structure of a URL is based on UNIX file description conventions and consists of four parts: the protocol, the host name, the path and the file name. For example:

--- http://www.mot.com/General/prodport.html

--- the location of the Motorola World Wide Web page. In this example the protocol is "http", the host name is "www.mot.com", the path is "/General/" and the file name is "prodport.html".

The protocol determines the type of access tool or telecommunications software that is required by the browser to fetch and read the files stored at the information source. Protocol descriptors commonly encountered include email, ftp, gopher, http, telnet to name just a few. The host name is often commonly referred to as the domain name. This descriptor indicates the name of the machine on which the information is located. The most common extensions encountered are:

.com which indicates a commercial organization;

.edu which indicates an educational institution, and

.org which indicates a non-profit organization.

Frequently the host name includes a 2-character country code suffix, which indicates the country in which the host resides. The path indicates in which directory on the host machine the file is located, while the file name indicates the specific file in which the information is found.

Turning again to the instant invention, techniques which the enhanced proxy may employ for query modifying include, alone or in combination, restricting access to an information source based on the protocol contained in the query and preventing access to specific information sources associated with the browser as being restricted sources.

Access to an information source may be restricted according to the protocol contained in the URL of the query. For example, the proxy may be configured to deny access to information sources of a specific type such as gopher, ftp (file transfer protocol) or email. An advantage of such a restriction is that the user may not know what type of information is being requested and may not wish to initiate a query which would cause the download of an exceptionally large file.

Access to specific information sources associated with the browser is restricted by, for example, denying access by a specific browser to specific URL sites or classes of URL sites. To accomplish this, the proxy configuration database 340 maintains lists of prohibited sites for different browsers or groups of browsers. A browser can make recommendations to add restricted sites to the block, on the basis of specific pages or entire domains. Restricted lists are maintained by the proxy centrally for all proxy subscribers. Further details of this process are illustrated in the flow diagram of FIG. 9.

Figure 9:
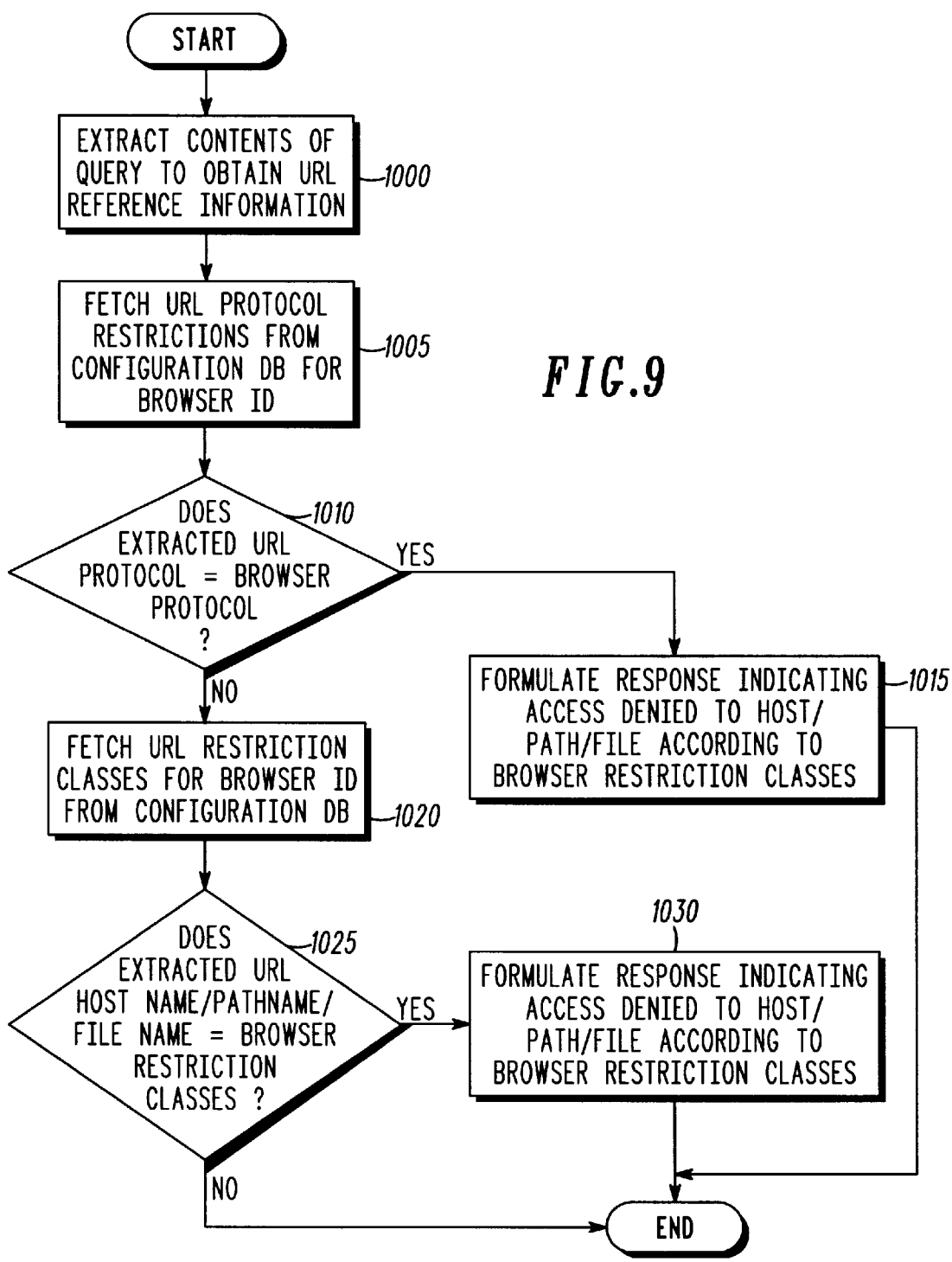
FIG. 9 is a flow chart describing the processes required to modify a query according to the established filtering services to restrict access to an information source.

In step 1000 of FIG. 9, the contents of a query are extracted to obtain URL reference information. In step 1005, protocol restrictions for the particular browser ID are fetched from the proxy configuration database 340. If, in step 1010, the extracted URL protocol matches a set of browser URL restriction parameters, step 1015 causes a response to be formulated (in proxy information storage 330) indicating that access through the URL protocol is not supported by the established configuration services. If, in step 1010, the extracted URL protocol does not match the restrictions, step 1020 causes the URL restrictions for the particular browser ID to be fetched from the configuration database 340. If, in step 1025 the extracted URL hostname, pathname and/or filename matches the browser restriction classes, step 1030 causes a response to be formulated indicating access to the host/path/file is denied according to the browser restriction classes established for that browser.

As a further example of modification of a query, at step 420 the proxy compares the URL of the query 160 to its restricted site list to determine if access is permitted. If access is denied, the query is modified to reflect the denial of access to the information source and to re-direct the query to the proxy information storage 330 rather than the denied information source, to retrieve a pre-stored message, for example a message informing the browser of the denial of access and reasons for denial, or other information.

There now follows a description of modification of a response to a query by the proxy. Modifications are classed as (i) modifications to responses which do not significantly affect the visible content of the response; (ii) modifications to responses which alter the visible content of the response; (iii) modifications to responses which visibly alter the content of the response and include links to the content prior to modification; and (iv) modifications to responses which visibly alter the content of the response and include links to other services. The first and second classes of modification deliver a full or partial but complete response with internal modifications. The third class of modification delivers an incomplete response. The former will be referred to as "internal" modifications and the latter will be referred to as "disjunctive" modifications. The fourth class of modification delivers an enhanced service and the visible altering of the content is subsidiary to the provision of the additional service and is, at a minimum, no more than provision of an indication of the availability of the additional service. Common to the third and fourth class of modification is the insertion of a link to the additional information or service.

An example of an internal modification is the suppression of the display of in-line graphic images which are frequently included in HTML pages. The proxy modifies the response so that the images are replaced by a textual reference to the name and/or size of the image which was suppressed. Such a modification is visible to the user of the recipient browser.

An example of a disjunctive modification to a response occurs when the filtering (i.e. modifying) services indicate that the proxy should impose a limit on the number of bytes which may be sent in a response to a browser. In such a case, the proxy splits the page of HTML information into smaller sub-components and modifies the response to include a textual reference indicating the size in bytes of the remaining sub-components. The modified response includes part of the HTML page and the textual size reference to the maximum number of bytes permitted for that particular browser.

Techniques that the proxy optionally employs for response modifying include any of the following alone or in combination with each other.

The three classes of modification referred to are now described in greater detail.

A. Modifications to Responses which do not Significantly Affect the Visible Content of the Response This class of modifications removes redundant information or information which is commentary in nature and is not normally visible to the user. There now follows four examples.

i) Remove comment tags. For example, HTML comment tags <!-- . . . --> and specialized informational tags, e.g. <meta>, <nextid> etc.

These can be removed by the following algorithms.

1. A high level "Remove informational tags" algorithm:
    1.1 Fetch the "list of tags to strip" for this browser.
    1.2 Scan the response for "start of tag" characters, and for each found:
        1.2.1 If the tag name matches a tag in the "list of tags to strip",
            1.2.1.1 Delete all characters until the matching "end of tag" character.
2. A more detailed "Remove informational tags" (without embedded tags):
    2.1 Set STATE to "not in tag to strip".
    2.2 For each character of the HTML response:
        2.2.1 If STATE is "not in tag to strip", then
            2.2.1.1 If the character is a start of tag (i.e. '<'), then
                2.2.1.1.1 For each element of the "tags to strip list":
                    2.2.1.1.1.1 If the tag in the response matches the tag in the list,
                        2.2.1.1.1.1.1 Set STATE = "in tag to strip", and
                        2.2.1.1.1.1.2 Break out of for loop.
                2.2.1.1.2 If STATE is still "not in tag to strip", then
                    2.2.1.1.2.1 Output the character, (i.e. '<'.)
            2.2.1.2 Else the character is not a start of tag, so output it.
        2.2.3 Else if STATE is "in tag to strip", then
            2.2.3.1 If the character is an end of tag (i.e. '>'), then
                2.2.3.1.2 Set STATE = "not in tag to strip".

This algorithm can easily be adapted to handle the stripping of tags with embedded tags.

ii) Remove unsupported or unwanted features. Many mobile browsers may not support all HTML options. For example, the <SCRIPT> and <STYLE> tags could be deleted.

iii) Remove unnecessary markup tags. Some embedded document markup and control language instructions are redundant. For example, in HTML an end-of-paragraph tag (i.e., </P>) can be removed where it is followed by a new paragraph symbol (i.e., <P>), separated by only white space. There are other examples of paired tags where a closing tag can be implied by a subsequent opening tag, such as <TH></TH>, <TD></TD>, and <TR></TR>.

iv) Shorten link URL addresses. Often documents contain links to documents on the same site. The URLs specified in those links may be full URLs or they may be relative to the current domain and or page. This method searches for and replaces full URLs with equivalent relative URLs which are shorter.

B. Modifications to Responses which Alter the Content of the Response

This class of modifications changes the content of the response in a manner which may be visible to the user. These modifications are useful when the browser is incapable of displaying the effected format of content or the user has decided not to retrieve this type of content. Five examples now follow.

i) Remove graphic images. All references to graphic images, e.g., HTML <img> tags, are either deleted completely or preferably replaced with a short text note. Note that <img> tags may contain an optional specification of suitable text to use (the "alt=" option). Alternately, the name of the image file can be used as replacement text.

ii) Reduce the size of graphic images. Size reduction can be achieved in a number of ways. For example: by converting from color to greyscale; by re-encoding the image using a more efficient compression algorithm; by reducing the resolution of the image; or by a combination of these methods. Note that it may be appropriate to reduce the size of graphic images to an upper bound limit which is chosen to be suitable for the communications protocol. These and other methods to reduce the size of images are per se known in the art, but here they are being applied as a specific response filtering technique.

iii) Remove background images. Background images can be removed simply by deleting the "background=" attribute from the <BODY> tag.

iv) Censor by content. This filter searches the response for pre-defined words, e.g., "sex" or "Nazi" or and, if found, replaces the entire response with a pre-defined message indicating the original response was censored. Alternately, each occurrence of the restricted word is replaced with some pre-defined text, such as "expletive deleted".

v) Reformat tables. HTML formatted tables can, often times, be translated into a more efficient (although not perfect) format. For example, they can be translated into a preformatted block (HTML's <pre> . . . </pre>) using line feed and tab characters to format. Furthermore, some basic browsers do not understand tables at all, but most understand preformatted text. For example, the simple HTML table (about 200 bytes):

```
<TABLE>
<TR><TH>Name <TH> Rate<TH> Hours </TR>
<TR><TD>Tom </TD> <TD> 50 </TD> <TD> 40 </TD>
</TR>
<TR> <TD>Dick </TD> <TD> 25 </TD> <TD> 40 </TD> </TR>
<TR> <TD>Harry </TD> <TD> 32 </TD> <TD> 22 </TD>
</TR>
</TABLE>
``` could be replaced with (about 50 bytes) as follows:
<pre>

| Name  | Rate | Hours |
|-------|------|-------|
| Tom   | 50   | 40    |
| Dick  | 25   | 40    |
| Harry | 32   | 22    |

</pre>

This translation can be effected simply by scanning the response and when the tag <TABLE> is encountered, starting a preformatted block (i.e. output a <PRE>). Then every <TR> output a line feed, and every <TH> or <TD> output a tab. All other white space is ignored. Upon reaching the </TABLE>, end the preformatted block </PRE>. Care must be taken if dealing with nested tables or other fancy constructions. The number of tabs (or other white space) can be adjusted based on the originally specified table dimensions. Tables can also be more easily translated into a comma delimited format which is commonly used with spreadsheets.

C. Modifications to Responses which Visibly Alter the Content of the Response and Include Links to the Content Prior to Modification This class of modifications changes the content of the response and, depending on the filtering characteristics in effect, selectively causes a link to be added to a temporarily stored version of the content that was altered. Four examples follow.

i) Replace an image with a link, such as a size-labeled link. For example, the following in-line image tag:

```
<IMG SRC="skyline.gif" ALT="New York Skyline"> is replaced with:
    <A HREF="http: //p1.proxy.net/tmp/1234/skyline.gif">
    [New York Skyline][54K] </A>
```

This has the effect of reducing the initial 46 byte IMG tag plus 54,000 bytes of skyline.gif (or whatever the image file size actually is) with a 77 byte link. The user chooses whether or not to fetch the 54,000 bytes of skyline.gif. Note that this method differs from known techniques of disabling images because (1) this mechanism includes an automatic link to the individual image file; and (2) the link information includes the size or approximate size of the image file.

As an improvement on this method of filtering and modifying, a configured size is predefined and only images that are larger than the configured size are replaced. The predefined size is included in the browser's configured filtering characteristics.

In another variant, the original image is automatically replaced with a very small compressed version of the image which is set up as a link. In this case, the original HTML is translated into:

```
<A HREF="http: //p1.proxy.net/tmp/1234/skyline.gif">
<IMGSRC="http: //p1.proxy.net/tmp/1234/thumbnail
of_skyline.gif" ALT="New York Skyline">[54K]</A>
``` where "thumbnail_of_skyline.gif" is a very small (to a configured maximum) version of the original image file created by the enhanced proxy using traditional image compression techniques. The following algorithm can be used to accomplish this:

1. Parse the response to be processed.
2. Upon finding an IMG tag, fetch the specified image file.
3. If the IMG tag is already in the scope of a link (an <A> in HTML), then note that fact for use later.
4. Determine the minimum image size to replace. This could either be a constant for the browser, dictated largely by the minimum overhead to replace an image with a link, or a value dictated by the filtering characteristics configured for the browser.
5. If the size of image file is less than this minimum size, goto step 7.0.
6. The image file is large enough to process, so do the following:
   6.1 Determine a location for the image file in the proxy local storage. This location would be a file, the name of which could be based on the original name of the image file (from the SRC attribute) and/or the date and time and/or the browser being served. Identifying the file in this way could facilitate garbage collection of the temporary file storage.
   6.2 Save the image file in that location.
   6.3 Replace the <IMG ... > tag with a "open link" tag (in HTML <A>), where the URL of the new link points to the filename containing the image just saved. Note that if the image had previously been within the scope of a link, as noted in step 2.0 above, then skip this step.
   6.4 Construct the label for the link (i.e. the text (or image) between the <A> and </A> tags). If a text label, then this can be constructed from the text specified by the ALT attribute of the IMG tag or from filename from the SRC attribute if there is no ALT attribute, and enclose this label in square brackets so the user can tell this a synthesized link. If configured for small image (i.e. thumbnail) link labels, then compress the image to the appropriate size, save a copy of it and insert an IMG tag referencing the small image.
   6.5 Insert the size of the image file (in K), enclosed in square brackets.
   6.6 Output the "close link" tag, (in HTML "</a>").
7. Return the (possibly modified) response.

ii) Split a response into smaller pieces, and into each piece add a link to the next piece and/or the previous piece and/or the remainder of the response.

This step can be performed after other steps described above. E.g., after other modifications have been made to the page, its size can be compared to some configured limit, and if above that limit, the page can be split into two or more pieces. Each piece is stored on the enhanced proxy's local information storage device, after it had been suitably modified.

Note that it is preferable to split the page intelligently, so as not to breakup a tag or paired tags, (e.g. start of table and end of table). It is also desirable not to break the page in the middle of a paragraph or word.

In the simplest embodiment, it is not necessary to break the page into all of the appropriate sized pages, just the first piece and the rest, then when the rest is accessed (if it ever is) the same process will split it again should this be needed. An algorithm to split an HTML response is:

1. Determine the current size of the response.
2. Determine the maximum size response for this browser by, for example, looking up the proxy configuration database entry for this browser, or by applying a maximum for this proxy.
3. If the current size of the response is less than the maximum,
   3.1 Return the response so it can be delivered to the browser.
4. Determine the maximum amount of the response that can be included in the first piece. This is the maximum size response, minus the size of the epilogue (link to rest of response and required ending of the response).
5. Parse the initial portion of the response, up to the maximum size to be sent, and determine a good place to break the page. For example, the page should never be broken in the middle of an HTML tag, and should avoid where reasonable, breaking the page between starting and endings of paired tags. Some tag pairs, such as for defining links (<A> ... </A>), must not be broken between starting and ending tag. However, it will usually be necessary to break between some starting and ending tag pairs. For example the <body> ... </body> tags and also <table> ... </table>. This can be done by keeping track of the nesting depth of tags as the initial part of the response is being parsed and noting good places to split the response.
6. Note the tags pairs that must be fixed up.
7. Break the page as determined above.
8. Prepare the "rest of response" piece, by:
   8.1 Repair the noted broken tag pairs, by adding new "start tags".
   8.2 Prepend a suitable preamble (title etc.).
   8.3 Determine a suitable location on the enhanced proxy local storage for the following piece, and save it there.
9. Fixup the "initial" piece of the response, by:
   9.1 Repair the noted broken tag pairs, by adding new "end tags".
   9.2 Add a link labeled "more" (or some such) at a good spot near the end of the initial page, and address it to the just created following page.
   9.3 Append any trailing information that may be required or desirable (e.g., an advertisement for the filtering proxy service).
   9.4 Append any needed "end of response" syntax, such as </body>.
10. Return the (now initial) response so it can be delivered to the browser.

Other variants of splitting, such as completely breaking into palatable sections and creating links to the next and previous pieces, would be preformed in a similar, albeit more complicated, way.

iii) Replace forms. Many smaller browsers do not support forms. Also forms can be very large, with large selection lists. Forms can be replaced in a number of ways. For example, the entire form (in HTML, between the <FORM> and </FORM> tag) can be replaced with a simple indication of the previous existence of the form, e.g.: <BR>[FORM]<BR>, which is more suitable if the browser does not support forms at all.

Alternatively, the indication can be a link to the form that was retained on the proxy in a manner similar to the mechanism above used to split responses. The indication can also leave the text of the form, but delete the fields, so the user of the browser can have an impression of what the original form contained. Again, this can either link to the complete form or not, as appropriate.

iv) Removing header and footer "boilerplate". Boilerplate is recognizable standardized text and/or graphics which is common to different pages, for example successive pages. Many web pages contain boilerplate such as advertisements or other not very interesting information at both the top and bottom of the page. Usually these are demarked from the content of the response by a horizontal line (in HTML, an <HR>). This filter identifies suspected boilerplate and either deletes it, or replaces it with a link to a saved version.

Some simple heuristics for doing this are to identify everything in the body if the response, above the first horizontal rule tag (i.e. <HR>), and everything below the lowest <HR>. This must be tempered by a rule such as "don't do this if the first (or last) <HR> is more than 10% into (or before the end of) the response". Another useful rule is to look for areas between <HR> tags or the edges of the body, which contain no text, just images and formatting information. It is likely that these are advertisements.

D. Modifications to Responses which Visibly Alter the Content of the Response and Include Links to Other Services Two Examples of These Follow i) Insertion of a standard link to a page in proxy information storage 330. Such a page includes, for example, help desk information, notices, advertisements, etc. The standard link is applied to all responses when this filtering service is invoked.

ii) A particularly interesting and useful form of modification to a response which includes a link to other services is the invoking of a non-proxy service in peripheral device 355, for example a non-proxy communication service such as a fax or paging service.

The link is inserted into responses when the filtering service is invoked and, if activated by the user at the browser, the link causes a predefined query to be received at the enhanced proxy 300 and causes the non-proxy service to be invoked, e.g. causing a fax to be sent to a prearranged fax number. Many such links can be added, each causing a different fax page to be faxed to the prearranged number. Such a service can be used, for example, for facilitating the automated delivery of graphic images to a browser not having graphic image capability. Alternatively, it can be used for ordering off-line prints of material where the user does not have time to request each page of the material. This feature is especially useful where on-line time is limited or the link 110 is a slow one, e.g. a bandwidth-limited radio link.

The link inserted by the enhanced proxy 300 in performing a modification of this nature is a link referencing the non-proxy service either directly as described above or via a form stored in proxy information storage 330. The form includes space for the user to insert a fax number or other information for the non-proxy service peripheral device 355 to perform its function. In this embodiment, the receipt at the enhanced proxy 300 of the completed form activates the peripheral device 355.

Thus, an improved method of accessing and retrieving information in a networked data communications system has been described comprising: sending from a browser to a proxy a query directed to an information source; modifying the query by the proxy to provide a modified query; forwarding the modified query to the information source; receiving at the proxy from the information source a response to the modified query; modifying the response by the proxy to provide a modified response; and forwarding the modified response to the browser.

The arrangement provides a user with a means of requesting and selecting different services such as filtering from the proxy. For instance, a browser may contain the ability to compress and un- compress information and the user may want to use that capability when transferring HTML data. In another instance, the proxy administrator may want to provide a service to the users of the proxy which prohibits the access of minors to specific servers.

This additional functionality is particularly useful where the browser link 110 is a wireless radio link, where the bandwidth is limited. As data transfer rates over a wireless radio browser link are relatively slow, it is advantageous to be able to select filtering services which reduce data transfer charges or avoid frustratingly large file transfers.

Modifications to the arrangements described can be made within the scope of the invention. For example a user's browser may be required to know the attachment points associated with each set of filtering services they wish to use. This information may be provided via prior communication with the proxy administrator.

It should be noted that the use of query filtering by the proxy does not preclude the use of response filtering, and vice versa.

The enhanced proxy 300 is described as having a cache available in which to store the retrieved information. Optionally the user may refuse the information, request only part of the information, or request all of the information. The proxy will be able to respond to the user by supplying the information according to the user's response to the advance indication coupled with the filtering characteristics defined for that user in the proxy configuration database. In a wireless communications system, advance file characteristic indication provides an improvement to Web browsing by not wasting the limited bandwidth of the channel by sending information which may not be wanted in its entirety by the user.

Enhancements to the proxy may include any of the following alone or in combination with each other:

i) automatically identifying details of pages (e.g. images, boilerplate, etc.) to facilitate local semi-permanent caching;

ii) automatically fetching cached HTML boilerplate;

iii) establishing a permanent "open" proxy session link for data transmission;

iv) encrypting the data;

v) compressing data;

vi) efficiently re-encoding HTML tags via an extension to the current HTML standard;

vii) abbreviate URL prefixes;

viii) fetching and caching URL references during an optimal time schedule;

ix) automatically adjusting the degree of browser modifications based on an optimal time schedule;

x) automatically adjust degree of browser modifications based on the response time to queries;

xi) reformatting tabular data to achieve optimal data compression;

Further modifications can be made within the scope and spirit of the invention.

What is claimed:

1. A proxy host computer comprising:
   a configuration database of services associated with browsers, further comprising a plurality of configuration pages representing different sets of services; and
   a database updater to update services associated with a browser upon receipt from the browser of a request for a configuration update, said request selecting one configuration page from said plurality of configuration pages.

2. The proxy host computer of claim 1, wherein the configuration database includes associations between services and attachment points of browsers.

3. The proxy host computer of claim 1 further comprising a wireless radio link connecting the proxy host computer to the browser.

4. A method of accessing and retrieving information in a networked data communications system comprising, at a proxy:
   receiving from a browser a query directed to an information source;
   establishing a set of services associated with the browser;
   selecting a method of filtering to apply to the query as a function of the set of services associated with the browser;
   modifying the query according to the method of filtering to provide a modified query;
   forwarding the modified query to another information source;
   receiving from the another information source a response to the modified query; and
   forwarding the response to the browser.

5. The method of claim 4 further comprising:
   at the browser configuring the browser to direct the query to a specific attachment point of a plurality of attachment points of the proxy; and
   wherein said step of receiving further includes receiving the query at the specific attachment point and said step of establishing a set of services depends on the specific attachment point.

6. The method of claim 4 wherein, the step of modifying the query comprises filtering the query information by the proxy.

7. The method of claim 4, wherein the set of services established for a selected browser are determined by at least one of:
   associating a class of service with a proxy host computer attachment point;
   implying proxy parameters from a browser query; and
   configuring proxy parameters for the selected browser in response to a fetched form.

8. The method of claim 7, wherein the step of configuring the proxy parameters includes:
   identifying a particular type of configuration request from contents of the query;
   modifying a proxy configuration parameter database according to information contained in the query; and
   sending a status response back to the selected browser on success or failure of the configuration request.

9. The method of claim 4, wherein the step of modifying the query as a function of the set of services established for a selected browser includes the steps of:
   providing an advance indication of characteristics of information requested; and
   altering the query by the proxy.

10. The method of claim 9, wherein the step of providing an advance indication of the characteristics of information requested includes at least one of:
    annotating a physical size of a data file on the proxy;
    annotating file type characteristics; and
    annotating a file content classification on the proxy.

11. The method of claim 4, wherein the set of services established for a selected browser are determined by associating a set of filtering methods based on capabilities of the selected browser.

12. A method of accessing and retrieving information in a networked data communications system comprising, at a proxy:
    receiving, at a specific attachment point, from a browser a query directed to an information source, the query directed to the specific attachment point of a plurality of attachment points of the proxy;
    establishing a set of services associated with the browser, said set of services depending on the specific attachment point;
    forwarding the query to the information source;
    receiving from the information source a response to the query;
    selecting a method of filtering to apply to the response as a function of the set of services associated with the browser;
    modifying by filtering the response according to the method of filtering to provide a modified response; and
    forwarding the modified response to the browser.

13. The method of claim 12, wherein the step of establishing a set of services for the browser comprises at least one of:
    implying proxy parameters from a browser query; and
    configuring proxy parameters for a browser in response to a fetched form.

14. The method of claim 13, wherein the step of configuring the proxy parameters includes:
    modifying a proxy configuration parameter database according to information contained in response to the fetched form; and
    sending a status response back to the browser.

15. The method of claim 12, wherein the step of modifying the response as a function of the set of services established for the browser includes the step of providing to the browser an advance indication of characteristics of information retrieved.

16. The method of claim 15 wherein the step of providing an advance indication of the characteristics of the information retrieved comprises at least one of:
    annotating a physical size of a data file on the proxy;
    annotating file type characteristics;
    annotating a file content classification on the proxy.

17. The method of claim 12 wherein the step of modifying the response comprises splitting pages of information into smaller components and said step of forwarding includes forwarding only a portion of the smaller components.

18. The method of claim 12 wherein the step of modifying the response comprises removing at least one of: text comments; forms; backgrounds; graphic images; embedded document markup and control language instructions; and boilerplate HTML commands.

19. The method of claim 12 wherein the step of modifying the response comprises at least one of:

reducing an image in size by re-encoding the image using a compression algorithm; and limiting a maximum size of a graphic image.

20. The method of claim 12 wherein the step of modifying the response comprises replacing an image with at least one of:

a textual reference to its size; and a reference name to local cache of the image.

21. The method of claim 12 wherein the step of modifying the response comprises reformatting tables.

22. The method of claim 12 wherein the step of modifying the response comprises at least one of:

minimizing universal resource locator (URL) prefixes; and restricting access to URL, classes.

23. A method of accessing and retrieving information in a networked data communications system having a proxy comprising:

recording at the proxy a set of services associated with a browser;

sending a query from the browser to the proxy, the query being directed to an information source;

selecting a method of filtering to apply to the query received from the browser as a function of the set of services associated with the browser;

modifying at least one of the query and a response to the query according to the method of filtering;

sending from the browser to the proxy a request to change the set of services associated with the browser; and re-defining the set of services associated with the browser upon receipt at the proxy of a request to access a configuration page at the proxy.

24. The method of claim 23 wherein the step of sending the query comprises accessing the configuration page at the proxy.

25. The method of claim 23 wherein the step of recording comprises:

registering the browser on the proxy;

establishing an initial default level of services; and associating the initial default level of services with the browser.

26. A method of accessing and retrieving information by a proxy in a networked data communications system comprising:

associating a set of services with each of a plurality of proxy attachment points;

receiving a query at a proxy attachment point from a browser;

selecting a method of filtering to apply to the query as a function of the set of services associated with the proxy attachment point;

modifying the query by the proxy according to the method of filtering to provide a modified query;

forwarding the modified query to an information source;

receiving at the proxy from the information source a response to the modified query; and forwarding the response to the browser.

27. A method of accessing and retrieving information by a proxy in a networked data communications system comprising:

associating a set of services with each of a plurality of proxy attachment points;

receiving a query at a proxy attachment point from a browser;

forwarding the query to an information source;

receiving at the proxy from the information source a response to the query;

modifying the response by the proxy according to the set of services associated with the proxy attachment point to provide a modified response; and forwarding the modified response to the browser.

28. A method of accessing and retrieving information in a networked data communications system comprising:

receiving from a browser at a proxy a query directed to an information source;

modifying the query by the proxy to provide a modified query;

forwarding the modified query to another information source;

receiving at the proxy from the another information source a response to the modified query;

modifying the response by the proxy to provide a modified response; and forwarding the modified response to the browser.

* * * * *